US008662129B2

(12) United States Patent
Kaplan et al.

(10) Patent No.: US 8,662,129 B2
(45) Date of Patent: Mar. 4, 2014

(54) SIDEWALL SHEAR DECOUPLING LAYER

(75) Inventors: Benjamin I. Kaplan, Sandaucourt (FR);
Fanny Hosdez, Clermont-Ferrand (FR);
Sébastien Rigo, Manzat (FR)

(73) Assignees: Compagnie Generale des Etablissements Michelin (FR);
Michelin Recherche et Technique S.A. (CH)

( * ) Notice: Subject to any disclaimer, the term of this patent is extended or adjusted under 35 U.S.C. 154(b) by 209 days.

(21) Appl. No.: 13/141,024

(22) PCT Filed: Mar. 6, 2009

(86) PCT No.: PCT/US2009/036310
§ 371 (c)(1),
(2), (4) Date: Jun. 20, 2011

(87) PCT Pub. No.: WO2010/074769
PCT Pub. Date: Jul. 1, 2010

(65) Prior Publication Data
US 2011/0253283 A1 Oct. 20, 2011

(30) Foreign Application Priority Data

Dec. 22, 2008 (WO) ............... PCT/US2008/087907

(51) Int. Cl.
*B60C 9/18* (2006.01)
*B60C 15/00* (2006.01)
*B60C 15/06* (2006.01)

(52) U.S. Cl.
USPC ........... 152/526; 152/532; 152/539; 152/549; 152/555

(58) Field of Classification Search
USPC .................................................. 152/526–555
See application file for complete search history.

(56) References Cited

U.S. PATENT DOCUMENTS

| 3,598,165 | A | 8/1971 | Hanus |
| 5,036,551 | A | 8/1991 | Dailey et al. |
| 5,511,599 | A | 4/1996 | Willard, Jr. |
| 6,505,663 | B2 | 1/2003 | Ahouanto et al. |
| 6,640,861 | B2 | 11/2003 | Pereira et al. |
| 6,959,534 | B2 | 11/2005 | Westgate et al. |

(Continued)

FOREIGN PATENT DOCUMENTS

JP 2002-301912 * 10/2002

OTHER PUBLICATIONS

International Search Report and Written Opinion for PCT/US2008/87907 dated Feb. 5, 2009.

(Continued)

*Primary Examiner* — Justin Fischer
(74) *Attorney, Agent, or Firm* — Frank J Campigotto

(57) ABSTRACT

A pneumatic tire having pairs of shoulder section and bead section shear layers positioned on at least one axial side of the carcass layer. Examples include one or more of the shear layers constituted of an elastomeric fabric having elastomeric fibers woven in the fabric. Such fibers may be spandex fibers and the fabric may further be characterized as being woven additionally with nylon fibers in a tricot construction. Other embodiments include at least one of the shear layers constituted of a polyurethane type elastomer material having an MA1O of between 1 MPa and 350 MPa. Exemplary shoulder section and bead section shear layers in a pinch shocked region are opposite across an interior of the tire.

16 Claims, 2 Drawing Sheets

(56) References Cited

U.S. PATENT DOCUMENTS

| | | |
|---|---|---|
| 6,994,134 B2 | 2/2006 | Grah |
| 7,066,225 B2 | 6/2006 | Rhyne |
| 2004/0187996 A1 | 9/2004 | Grah |
| 2008/0149249 A1 | 6/2008 | Rahier et al. |
| 2010/0108218 A1* | 5/2010 | Lamontia et al. ............. 152/450 |

OTHER PUBLICATIONS

International Search Report and Written Opinion for PCT/US2009/36310 dated May 4, 2009.

* cited by examiner

SIDEWALL SHEAR DECOUPLING LAYER

BACKGROUND OF THE INVENTION

1. Field of the Invention

This invention relates generally to tire sidewall architecture and more specifically, to a shear decoupling layer in the sidewall for minimizing tire damage from pinch shock.

2. Description of the Related Art

As used here, pinch shock describes a tire condition that can result when the tread section of the tire is impacted in a manner that causes the shoulder section of the tire to contact or nearly contact the bead section of the tire. In such condition, the sidewall of the tire buckles or folds over itself as the shoulder section makes or nearly makes contact with the bead section. During such pinching, the rubber mix and carcass layer of the tire composite structure are compressed between the rim and an obstacle or other feature in the travel path of the tire. Since the rubber-based materials used in the tire are virtually incompressible, the rubber expands in directions largely perpendicular to the forces causing the pinch. Such expansion is known as the Poisson effect. The rubber expansion is transferred as a displacement to the carcass layer cords and under certain conditions, such as a severe impact, the carcass layer cords may undergo a deformation beyond their rupture strength causing the cords to sever.

It has been observed that such damage from pinch shock often results in the carcass layer cords being severed in two different places—either within the shoulder section of the tire, within the bead section of the tire or both. Such severing of the cords is undesirable because the cords contribute to the structural integrity of the tire. Depending on the number of cords that are broken, the tire may show a deformation or a cut or if the damage is severe enough, a tire deflation.

In general, poor road conditions or other factors causing severe impact on the tread section of the tire can be responsible for pinch shock. For example, unpaved or poorly paved roads may have a variety of holes or other sudden changes in elevation that can lead to pinch shock. Similarly, roads containing debris or other obstructions can cause pinch shock as the tire encounters such obstacles in the road. Accordingly, for road surfaces where conditions leading to severe pinching of the tire are anticipated or expected, a tire more resistant to the breaking of radial plies is desirable.

SUMMARY OF THE INVENTION

Particular embodiments of the present invention include pneumatic tires having increased resistance to damage from pinch shock, such embodiments having one or more shear layers in the shoulder section and in the bead section of the tire. Particular embodiments include a pneumatic tire having a pair of shoulder section shear layers, one of the pair located at each sidewall respectively and each positioned on at least one axial side of the carcass layer, the shoulder section shear layers extending from the sidewall towards the crown. Such tire may further include a pair of bead section shear layers, one of the pair located at each sidewall respectively and each positioned on at least one axial side of the carcass layer, the bead section shear layers extending from the sidewall towards the bead core.

Particular embodiments include at least one of the shear layers constituted of an elastomeric fabric having elastomeric fibers woven in the fabric. Such fibers may be spandex fibers and the fabric may further be characterized as being woven additionally with nylon fibers in a tricot construction.

Particular embodiments include at least one of the shear layers constituted of a polyurethane type elastomer material having an MA10 of between 1 MPa and 350 MPa.

Particular embodiments include at least one of the shear layers constituted of an elastomer composition having a modulus of elongation measured at 10% (MA10) of no greater than 110% of an MA10 selected as a lowest MA10 of all elastomer compositions constituting the sidewall components that are positioned outward of an axially-inward side of the carcass layer and wherein the shoulder section shear layers and the bead section shear layers in a pinch shocked region of the tire are opposite to one another across an interior of the tire.

Particular embodiments may include at least one of the bead section shear layers constituted of an elastomer composition having a modulus of elongation measured at 10% (MA10) of no greater than 110% of an MA10 selected as a highest MA10 of all elastomer compositions constituting the sidewall bead section components axially-outward of the carcass layer.

Particular embodiments may include at least one of the pairs of shoulder section and bead section shear layers constituted of a short-fiber reinforced elastomer composition having a modulus of elongation measured at 10% (MA10) of between 25 MPa and 100 MPa.

Particular embodiments may include the shoulder section shear layers extending from the sidewall to a position radially-inward of the crown ply by a predetermined distance d from an axial edge of the crown ply and/or the bead section shear layers extending from the sidewall to a position located at a predetermined distance h from the center of the bead core in a direction perpendicular to an axial direction of the tire. The distance d may, for example, be at least 10 mm and the height h may, for example, be no more than 15 mm.

Particular embodiments may include bead section shear layers that extends towards the sidewall to a point that is, for example, at least 30 mm from the center of the bead core and/or include shoulder section shear layers that extend from the axial edge of the crown ply towards the bead section for a distance that is, for example, at least 20 mm.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
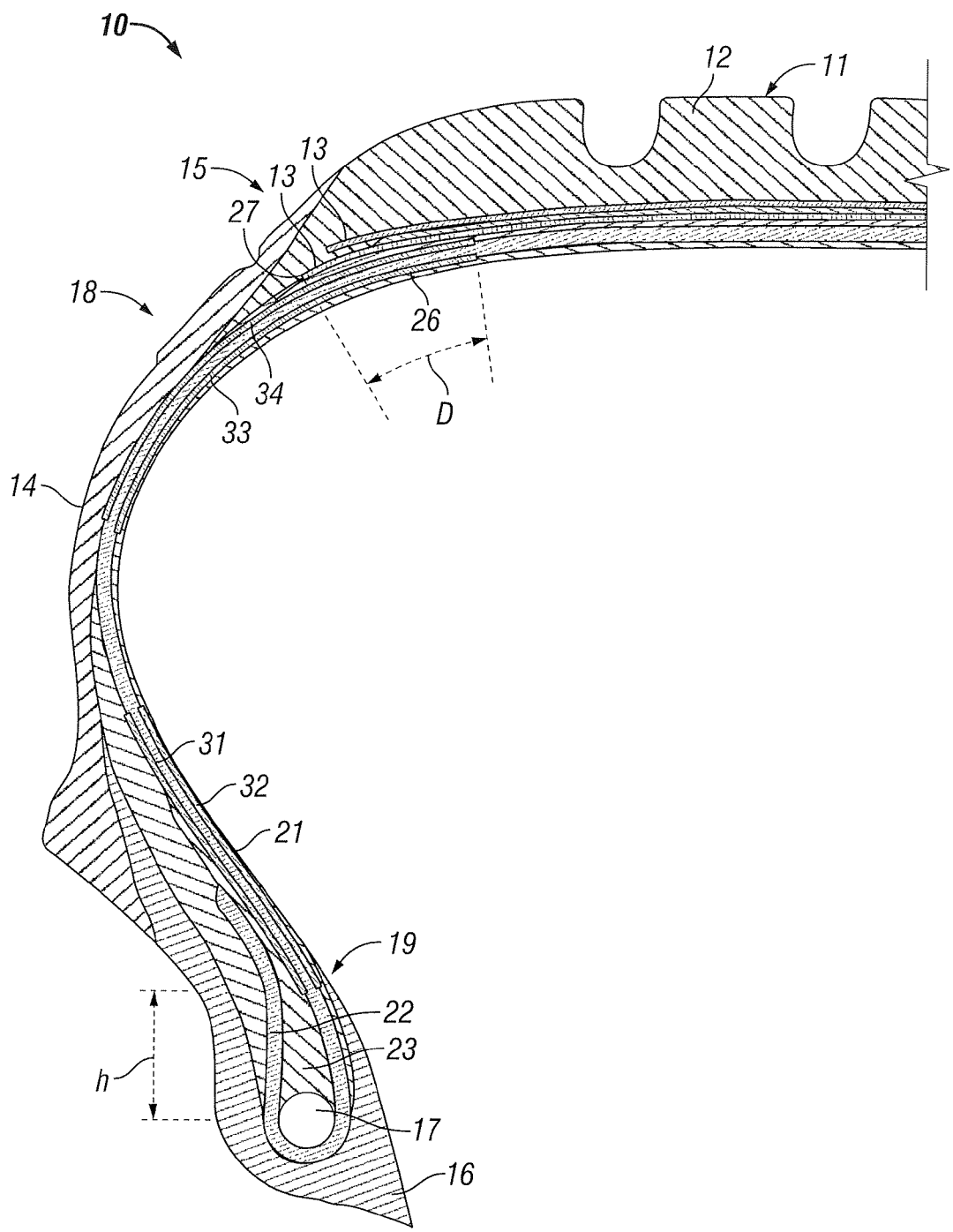
FIG. 1 is a partial sectional view of an exemplary embodiment of a pneumatic tire in accordance with the present invention.

Particular embodiments of the present invention include pneumatic tires having increased resistance to damage from pinch shock. Various embodiments include shear layers provided at various locations in the sidewall of the tire to provide resistance to pinch shock damage. Such pinch shock damage may include, for example, breakage of one or more cords in the carcass layer. More specifically, for such embodiments, shear layers are provided in the shoulder sections and in the bead sections of the tire in locations such that when the tire is in a pinch shocked condition, the shoulder section shear layers and the bead section shear layers in the pinch shocked region of the tire are opposite to one another across the tire interior.

As used herein, pinch shock describes a tire condition that can result when the tread section of the tire is impacted in a manner that causes the shoulder section of the tire to contact or nearly contact the bead section of the tire. The pinch shocked region of a tire that is undergoing pinch shock is therefore that section of a tire where the shoulder section of the tire contacts or nearly contacts the bead section of the tire.

It is thought that the shear layers act as shear decoupling layers to minimize the damage that may occur from a tire in a pinch shocked condition. Since the cords of the carcass layer and the rubber surrounding the cords (the elastomeric matrix) have different moduli of elongation, when the tire undergoes extreme deformation as in pinch shock there is a shear developed at the interface between the cords and the rubber next to cords, i.e., the rubber encasing the cords in the carcass layer. It is thought that placing the shear layer on at least one side of the carcass layer limits the shear in the interface by decoupling it. With the shear decoupled, damage to the cords from pinch shock is minimized.

The shear layers that provide increased resistance to pinch shock tire damage are positioned on at least one axial side of the carcass layer 1) in the shoulder area of each side of the tire and 2) in the bead area of each side of the tire. More specifically, particular embodiments may include shear layers that are located on the axially-inward side of the carcass layer, on the axially-outward side of the carcass layer or on both sides of the carcass layer. For those embodiments that include placement of the shear layer on only one side of the carcass layer, the placement of the shoulder section shear layers and the bead section shear layers may be on the same side of the carcass layer, e.g., both the shoulder and bead section shear layers are located on the axially-inward side of the carcass layer, or on opposite sides of the carcass layer. In particular embodiments, one or more of the shear layers may be separated from the surface of the carcass layer by no more than 5 mm or alternatively, no more than 3 mm or no more than 1 mm. More specifically, in these embodiments an intervening layer of material may be included between the side of the carcass layer and the shear layer that is positioned adjacent to, but not on, the side of the carcass layer.

It should also be noted that in particular embodiments, one of the sections of shear layers may have shear layers on both sides of the carcass layer while the other section of shear layers may have a shear layer on only one side of the carcass layer. For example, the bead section shear layers may include bead shear layers on both sides of the carcass layer while the shoulder section shear layers may include one shoulder shear layer on only one side of the carcass layer.

The shear layers can be quite thin with some embodiments having a shear layer thickness, for example, of between 0.2 mm and 2 mm while other embodiments may have a shear layer thickness of between 0.3 mm and 1.5 mm, between 0.3 mm and 1 mm, between 0.3 mm and 0.7 mm or between 0.4 mm and 0.7 mm. The shear layers may be positioned against the carcass layer, for example, by laying the shear layer in as a sheet during the tire build process or by extrusion during the tire build process or by co-extrusion with the carcass layer, all methods which are well known to one having ordinary skill in the art. The thickness of shear layers in particular embodiments having shear layers constituted of elastomeric fabric or polyurethane based materials may range between 0.05 mm and 3 mm or alternatively any of the thicknesses listed above or between 0.1 mm and 3 mm, between 0.5 and 3 mm, between 0.5 and 2 mm or between 0.5 mm and 1 mm. In particular embodiments having shear layers constituted of polyurethane type elastic materials, the thickness may be quite thin—even less than 50 microns—when the material is sprayed or brushed on.

It may be noted that while in some embodiments the shear layers may all have the same thickness, there is no requirement for that to be the case. One or more of the shear layers may have a different thickness than the other shear layers. Furthermore, one or more of the shear layers may have a differing thickness over the length of the shear layer.

It should be noted that while the invention describes the shear layers as being shoulder section shear layers and bead section shear layers, such description only teaches that the shear layers be placed on and/or adjacent to the carcass layer at least in the shoulder areas and in the bead areas of a tire. Particular embodiments may include, for example, providing a continuous shear layer on one or more sides of the carcass layer from one bead area, through the crown area and all the way to the other bead area. Other embodiments may include, for example, extending the bead shear layer from the bead section to the shoulder shear layer, thereby providing a continuous shear layer from the start of the bead shear layer through the end of the shoulder shear layer within or near the crown.

As noted above, particular embodiments of the present invention position the shoulder section shear layers and the bead section shear layers in predetermined locations and with predetermined lengths to ensure that the shoulder section shear layers and the bead section shear layers in the pinch shocked region of the tire are opposite to one another across the tire interior.

In particular embodiments, the shoulder section shear layers may all have the same length and the bead section shear layers may all have the same length. However, in other embodiments the lengths of the shoulder section shear layer may differ by starting at different locations and/or ending at different locations along the length of the carcass layer and likewise, the lengths of the bead section shear layers may differ by starting at different locations and/or ending at different locations along the length of the carcass layer.

The shear layers may be constituted of elastomer compositions such as, for example, rubber compositions typically used in tire constructions. Elastomers are known to be those materials that essentially recover their original shape after being stretched. Alternatively the shear layers may be constituted of polyurethane type elastomer materials and/or of fabrics comprising elastomer fibers. Polyurethane type elastomer materials as used herein are polyurethanes, polyureas and polyurethaneureas. It has been determined that the shear layers may be constituted of elastomer compositions selected on the basis of their modulus of elongation at 10% elongation (MA10) as compared to the MA10 of other elastomeric compositions constituting the other sidewall components of the tire, as discussed below.

As used herein, both in the specification and the claims, such moduli of elongation are expressed in units of MPa and are measured at a temperature of 23° C. in accordance with ASTM Standard D412 on dumb bell test pieces. These measurements are secant moduli in MPa, based on the original cross section of the test piece. Generally a material having a higher MA10 is a harder material and a material having a lower MA10 is a softer material. The dumbbell test pieces may be made of the rubber compositions typically used in tire construction or in the other materials suitable for shear layer construction such as the elastomeric fiber fabric and the polyurethane type elastomer material.

Therefore, a material that is softer than a second material is one that has an MA10 that is less than the MA10 of the second material. A material that is "almost softer" than a second material is one that has an MA10 that is no more than 110% of the MA10 of the second material or alternatively, no more than 107%, no more than 105%, no more than 103% or equal to the MA10 of the second material.

Further, in particular embodiments, the shear layers may be constituted of rubber compositions selected on the basis of their MA10 as compared to the MA10 of the other elastomer compositions constituting the other sidewall components of the tire that are positioned outward of the axially-inward side of the carcass layer. More specifically, suitable rubber compositions from which the shear layers may be constituted for particular embodiments are those that may be characterized as being a) softer or almost softer than the softest material constituting a sidewall component axially-outward from the axially-inward side of the carcass layer or b) softer or almost softer than the softest material constituting a sidewall component in the tire section in which the shear layer is located and which is axially-outward from the axially-inward side of the carcass layer. Note that the inner liner is therefore excluded as being considered as a sidewall component for purposes of selection of a shear layer material.

For example, the bead section shear layers may be constituted of a rubber composition that is softer than the softest material constituting any sidewall component (not counting the inner liner) or of a rubber composition that is softer than the softest material constituting a bead section component (not counting the inner liner). Additionally, the shoulder section shear layers may be constituted of a rubber composition that is softer than the softest material constituting any sidewall component or of a rubber composition that is softer than the softest material constituting a shoulder section component (for both, again not counting the inner liner).

Another basis on which a suitable elastomer composition may be selected applies to the selection of the bead section shear bands. For the bead section shear bands, the composition may be selected as being c) softer or almost softer than the hardest elastomer composition in the bead section. In most tires the hardest elastomer composition would be that constituting the bead filler of the tire.

Another basis on which suitable elastomer compositions may be selected for constituting shear bands of particular embodiments is to select a material that may be characterized as d) a short-fiber reinforced elastomer composition that has an MA10 of between 25 MPa and 100 MPa or alternatively, between 40 MPa and 80 MPA, between 45 MPa and 75 MPa or between 50 MPa and 70 MPa Short-fiber reinforced elastomer compositions are those having between 1 and 20 parts by weight per hundred parts by weight of elastomer (phr) or alternatively between 2 phr and 15 phr, between 3 phr and 13 phr or between 5 phr and 10 phr. The short fibers may be constituted from such materials, for example, as aramid, glass, polyester, polyethylene terephthalate (PET), polyethylene naphthalate (PEN) or nylon. Mixes of one or more different types and/or lengths of short fibers may be added to particular embodiments of the shear layers. The short fibers may have lengths, for example, of between 0.01 and 5 mm or alternatively between 0.1 and 5 mm, between 0.5 mm and 5 mm or between 1 and 4 mm. In particular embodiments, any length of short fibers that can be incorporated into the rubber composition would be suitable.

An example of a procedure that might be used to select a suitable material as a shear layer in accordance with the present invention would include obtaining the MA10 for each elastomer material constituting a component of the sidewall, the bead section and the shoulder section, excluding the inner liner. Such components may include, for example, the outer skim of the sidewall, the bead filler, the tread and the elastomer matrix of the carcass layer. Then, since the elastomer matrix of the carcass layer is typically the softest material in the sidewall, both the shoulder section shear layers and/or the bead section shear layers may be constituted of a rubber composition that is softer than the elastomer matrix of the carcass layer. Likewise, the shoulder section shear layers and/or the bead section shear layers may be constituted of a short-fiber reinforced elastomer material having an MA10 of 50 MPa. Alternatively, the bead section shear layers may be constituted from a rubber composition softer than the bead filler, if (as is typically the case) the bead filler is the hardest material in the bead section of the tire.

For particular embodiments of the present invention, the shear layers may all be constituted of the same material as long as the constraints a-d for any rubber composition material selection provided above are satisfied. Alternatively, one or more of the shear layers may be constituted of a different material than the others as long as the constraints a-d provided above are satisfied for any rubber composition material. Each of the one or more shear layers may also be constituted from different materials along the length of the shear layer and/or from the same material along the length of the shear layer as long as the constraints a-d provided above are satisfied for any rubber composition material.

Suitable rubber compositions for constituting the shear layers include those rubber compositions that are suitable for use in the construction of a tire as known to those having ordinary skill in the art. Typically such rubber compositions are based upon a diene rubber such as natural rubber, synthetic diene rubber or combinations thereof.

Diene elastomers or rubber is understood to mean those elastomers resulting at least in part (i.e., a homopolymer or a copolymer) from diene monomers (monomers bearing two double carbon-carbon bonds, whether conjugated or not). Essentially unsaturated diene elastomers are understood to mean those diene elastomers that result at least in part from conjugated diene monomers, having a content of members or units of diene origin (conjugated dienes) that are greater than 15 mol. %. an essentially unsaturated rubber elastomer Thus, for example, diene elastomers such as butyl rubbers, nitrile rubbers or copolymers of dienes and of alpha-olefins of the ethylene-propylene diene terpolymer (EPDM) type or the ethylene-vinyl acetate copolymer type do not fall within the preceding definition, and may in particular be described as "essentially saturated" diene elastomers (low or very low content of units of diene origin, i.e., less than 15 mol. %. Particular embodiments of the present invention may include no essentially saturated diene elastomers.

Within the category of essentially unsaturated diene elastomers are the highly unsaturated diene elastomers, which are understood to mean in particular diene elastomers having a content of units of diene origin (conjugated dienes) that is greater than 50 mol. %. Particular embodiments of the present invention provide shear layers that are based only upon highly unsaturated diene elastomers.

The rubber elastomers suitable for use with particular embodiments of the present invention include highly unsaturated diene elastomers, for example, polybutadienes (BR), polyisoprenes (IR), natural rubber (NR), butadiene copolymers, isoprene copolymers and mixtures of these elastomers.

Also suitable for use in particular embodiments of the present invention are rubber elastomers that are copolymers and include, for example, butadiene-styrene copolymers (SBR), butadiene-isoprene copolymers (BIR), isoprene-styrene copolymers (SIR) and isoprene-butadiene-styrene copolymers (SBIR), mixtures thereof and/or with other essentially unsaturated and/or highly unsaturated rubber elastomers.

Also suitable for use in particular embodiments of the present invention are rubber elastomers that include, for example, natural rubber, synthetic cis-1,4 polyisoprenes and mixtures thereof and/or with other essentially unsaturated and/or highly unsaturated rubber elastomers. These synthetic cis-1,4 polyisoprenes may be characterized as possessing cis-1,4 bonds at more than 90 mol. % or alternatively, at more than 98 mol. %.

In addition to the diene elastomer, the elastomer compositions suitable for constituting the shear layers may include additional components as known to one having ordinary skill in the art. Such additional components may include, for example, reinforcing fillers, coupling agents, plasticizers, various processing aids, oil extenders, antidegradants or combinations thereof. Suitable fillers include carbon black as well as inorganic fillers ("white fillers") such as silica, alumina, aluminum hydroxide, clays and/or calcium carbonate. The elastomer compositions may further include curing systems such as, but not limited to, a sulfur curing system including, for example, sulfur, accelerators, zinc oxide and stearic acid.

As disclosed above, in addition to shear layers constituted of rubber compositions, the shear layers may alternatively be constituted of polyurethane type elastomer materials and/or fabrics comprising elastomer fibers.

A fabric comprising elastomer fibers is a fabric woven with an elastomeric fiber and with a natural and/or manmade fiber. An example of such a fabric is one made with spandex, which in Europe and other parts of the world is commonly referred to as elastane. Spandex is a well known material and is generally defined as a synthetic elastomeric fiber having a very high elasticity to break point (up to approximately 500% to 600%) and a high recovery from stretching. Though the chemistry is very complex, basically spandex is a series of elastomeric products including hard and soft segments and cross linking between the same. The fibers produced are generally stronger and lighter than rubber. The properties of spandex include high stretch, low set (the ability to spring back to its original shape concluded after repeated stretching), high durability, uniformity and versatility.

Fabrics having spandex fibers generally are woven with other additional manmade or natural fibers such as cotton, wool, silk, linen, nylon, rayon and so forth. Swimwear is an example of well known products made with elastomer fibers, often made with nylon and spandex. The nylon/spandex combination is often woven in a tricot construction and typically includes 80% nylon and 20% spandex, such as LYCRA (a registered trademark of DuPont Corporation). This fabric is commonly used for its four-way stretchability, i.e. the ability to stretch in both the length and width directions of the fabric. Another well known fabric weave is the raschel-type construction, often having a higher nylon content (about 85% nylon and about 15% spandex). The stretch of the fabric having a raschel-type construction is typically significantly greater in one direction than the stretch in the other.

Without limiting the invention, particular embodiments of the present invention include one or more shear layers constituted from fabric comprising the nylon/spandex combination woven in the tricot construction. Other embodiments may include the combination woven in the raschel-type construction. Both constructions are well known in the textile industry.

Polyurethane type elastomer materials are also suitable for use as one or more of the shear layers for particular embodiments of the present invention. Suitable polyurethane type elastomer materials include polyurethanes, polyureas and polyurethaneureas having an MA10 of between 1 MPa and 350 MPa or alternatively between 5 MPa and 280 MPa, between 30 MPa and 250 MPa, between 40 MPa and 230 MPa or between 50 MPa and 190 MPa. In particular embodiments using liquid polyurethane type elastomer materials, the shear layers may be brushed, sprayed or extruded on during the tire construction process.

Reference will now be made in detail to embodiments of the present invention, one or more examples of which are illustrated in the figures. Each example is provided by way of explanation of the invention and is not meant to be delimitative of the invention in any way. It should be noted that for purposes of discussion, only half of the exemplary tire embodiments are depicted in the figures. One of ordinary skill in the art, using the teachings disclosed herein, will understand that the same or substantially similar features are repeated on both sides of the tire.

Referring now to FIG. 1, a pneumatic radial tire 10 is provided having features, as will now be further described, for providing increased resistance to pinch shock under certain adverse travel conditions as discussed above. The tire 10 has a tread 11 for contacting the road surface. The tread 11 is supported by a crown 12 that is positioned radially-inward of the tread 11, the crown 12 having a belt package or crown plies 13 to stiffen the casing and provide improved wear and handling response. The sidewall 14 extends in a direction radially-inward from an axial edge 15 of the crown 12. The shoulder section 18 of the tire 10 is formed in the upper portion of the sidewall 14. A tire bead 16 is located radially-inward of the sidewall 14 and includes a circumferentially-inextensible bead core 17. The bead section 19 of the tire is formed in the lower portion of the sidewall 14. Although depicted as a single element, the bead core 17 may typically include a bundle of metallic strands oriented circumferentially through the bead 16. The tire 10 further may include an inner liner 26, which forms an inner surface of the tire and inhibits the passage of the inflating gas through the tire 10. One of ordinary skill in the art will understand, using the teaching disclosed herein, that the present invention is not limited to the precise shape of bead 16, the tread 11, the sidewall 14 or the tire 10 as depicted in the attached FIGS. 1 and 2. Other embodiments for mounting a tire on a variety of differently sized and shaped rims fall within the scope of the present invention.

A pneumatic tire 10 further includes a carcass layer 21. The carcass layer 21 extends between the beads 16 of the tire 10 and terminates in a pair of carcass layer ends 22. Each carcass layer end 22 is formed by wrapping the carcass layer 21 around one of the bead cores 17 and then terminating the carcass layer 21 after extending it for a predetermined distance in a radially-outward direction along the sidewall 14. The carcass layer 21 extends through the crown 12 at a position that is radially-inward of the belt package 13. A bead filler 23, made of a harder rubber composition, is positioned radially-outward of each bead 16 and separates the carcass layer 21 from the carcass layer ends 22. As known to one having ordinary skill in the art, the arrangement and size of the bead filler 23 and the carcass layer ends 22 are predetermined by the design criteria of the tire and any suitable geometry of these components fall within the scope of the present invention.

Typically, the carcass layer 21 is constructed from a plurality of mutually parallel textile cords embedded in an elastomeric matrix, such as a thin layer of a rubber composition. As known to one having ordinary skill in the art, the carcass layer 21 is typically formed using a calendering process wherein the cords are laid parallel to each other and encased in the elastomeric matrix. The cords may be made from materials such as, for example, polyester, nylon, aramid, rayon or a combination of these textile materials. The carcass layer 21 is then arranged in a manner such that the cords are typically oriented in a radial direction along the sidewalls 14 of tire 10. More specifically, along the sidewalls 14 of the tire 10, the cords of carcass layer 22 are substantially perpendicular to the axis of rotation of tire 10.

Additionally the tire 10 is provided with shoulder section 18 shear layers 33, 34 and bead section 19 shear layers 31, 32. The shoulder section shear layers of this exemplary embodiment include one shoulder shear layer 34 that is positioned on the axially-outward side of the carcass layer 21 and one shoulder shear layer 33 that is positioned on the axially-inward side of the carcass layer 21. Likewise, the bead section shear layers include one bead shear layer 31 that is positioned on the axially-outward side of the carcass layer 21 and one bead shear layer 32 that is positioned on the axially-inward side of the carcass layer 21.

The shoulder section shear layers 33, 34 extend from the sidewall 14 to a position radially-inward of the belt package 13. In particular embodiments the shoulder section shear layers extend a predetermined distance d towards the crown 12 and past the axial edge 27 of the radially-inward belt 13. In particular embodiments the predetermined distance d is at least 10 mm but could be longer or shorter depending upon other considerations such as, for example, the process of manufacture or tire performance considerations other than pinch shock. In particular embodiments the shoulder shear layers extend from the axial edge 27 of the belt 13 towards the bead section 19 for a predetermined distance that is at least 20 mm. However, such distances are not provided to be delimitative of the invention.

The bead section shear layers 31, 32 extend from the sidewall 14 to a position within the bead section 19. In particular embodiments the bead section shear layers 31, 32 extend from the sidewall to a position located at a predetermined distance h from the center of the bead core 17 in a direction perpendicular to an axial direction of the tire 10. In particular embodiments the predetermined distance h is 15 mm or less but could be longer or shorter depending upon other considerations such as, for example, the process of manufacture or tire performance considerations other than pinch shock. In particular embodiments the bead shear layers 31, 32 extend towards the sidewall to a point that is at least 30 mm or more from the center of the bead core 17. However, such distances are not provided to be delimitative of the invention.

Figure 2:
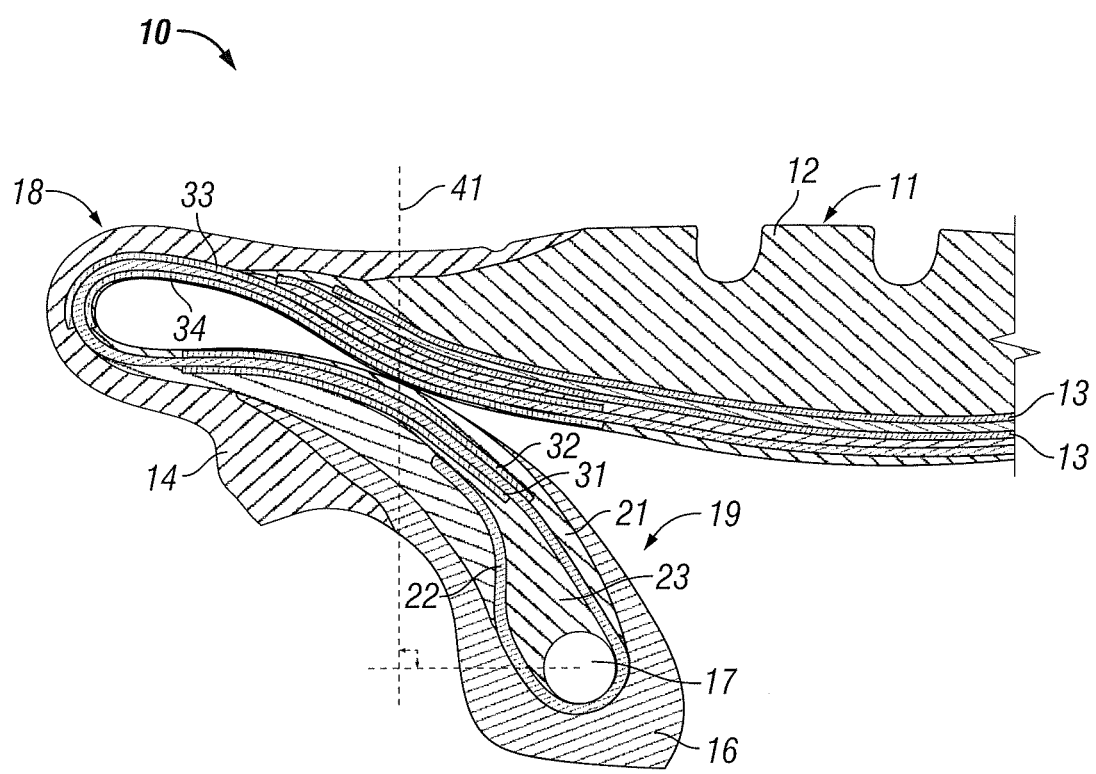
FIG. 2 is a partial sectional view of the tire shown in FIG. 1 undergoing pinching.

FIG. 2 is a partial sectional view of the tire shown in FIG. 1 undergoing pinch shock. The pinch shocked region of a tire 10 is that section of a tire where the shoulder section 18 of the tire contacts or nearly contacts the bead section 19 of the tire 10. The shoulder section shear bands 33, 34 and the bead section shear bands 31, 32 are opposite to one another across the tire interior in accordance with particular embodiments of the present invention. Thus, a line 41 drawn perpendicularly from a line passing through the center of the bead core 17 in an axial direction passing through the pinch shocked region will pass through at least one of the bead section shear bands and at least one of the shoulder section shear bands when the shear bands are opposite to one another across the tire interior.

The invention is further illustrated by the following examples, which are to be regarded only as illustrations and not delimitative of the invention in any way. The properties of the compositions disclosed in the examples were evaluated as described below.

Moduli of elongation (MPa) were measured at 10% (MA10) and 100% (MA 100) at a temperature of 23° C. based on ASTM Standard D412 on dumb bell test pieces. The measurement were taken in the second elongation; i.e., after an accommodation cycle. These measurements are secant moduli in MPa, based on the original cross section of the test piece.

Example 1

This example demonstrates that providing a shear layer between the carcass layer and the material surrounding the carcass layer in accordance with the present invention improves resistance to tire damage caused by pinch shock. Samples were prepared and tested by a test method that is quasi-static in nature and that accurately predicts the likelihood of pinch shock damage to a tire.

The test method included squeezing a composite sample between two bars that were placed at an angle one to the other. The composite sample was 10 mm thick having a carcass layer placed in the middle of the surrounding mix. The force required to squeeze the composite sample between the two bars until the first carcass layer cord broke was measured. The higher the force necessary to break the first carcass layer cord, the better the composite sample was ranked for resisting damage from pinch shock.

Two series of tests were conducted. The first series was run on composite samples having a surrounding mix that had an MA10 of 30 MPa with the results shown in Table 1. The second series was run on composite samples having a surrounding mix that had an MA10 of 3.5 MPa with the results shown in Table 2. These rubber compositions were typical rubber compositions used in a tire. More specifically, the composition used having the higher MA10 was a typical rubber composition used as a bead filler in a tire. The composition having the lower MA10 was a typical composition used as the elastomer matrix of a carcass layer. Such compositions and their method for making and curing are well known to one having ordinary skill in the art.

Each series was run with a witness (W1 and W2) composite sample having only the carcass layer engulfed in the middle of the surrounding mix. The carcass layer included PET cords enclosed in an elastomer matrix having an MA10 of 3.2 MPa. The PET was PET 1670/2 at 370 tpm. The force to rupture the PET cords was close to 20 daN and 15% elongation at break. The cord density used was 119 f/dm and the shrinkage was close to 0.9%.

Additional composite samples (S1-S10) were prepared with shear layers made of rubber compositions having MA10 measurements as shown in the Tables 1 and 2. These rubber compositions were typical rubber compositions used in a tire. More specifically, the compositions used for the shear layers in S1 and S2 were compositions typically used as the elastomer matrix in a carcass layer. The composition used for the shear layers in S3 was a composition typically used to separate the belts in a tire crown. The compositions used for the shear layers in S4 and S5 were compositions typically used as the bead filler in a tire. Such compositions and their method for making and curing are well known to one having ordinary skill in the art.

The shear layers were each 0.6 mm thick and were added on either one side or both sides of the carcass layer. The thickness of the composite samples was maintained at 10 mm including the added thickness of the shear layers.

The force necessary to break the first carcass layer cord was then measured for each composite sample and compared to the force necessary to break the first cord in the witness composite sample. The results were normalized and are reported in Tables 1 and 2.

TABLE 1

Pinch Shock Test Results with Surrounding Mix having MA10 of 30 MPa

|  | W1 | S1 | S2 | S3 | S4 | S5 |
|---|---|---|---|---|---|---|
| Shear Layer MA10, MPa |  | 2.5 | 3.5 | 12 | 29 | 56 |
| Force Index with No Shear Layer | 100 |  |  |  |  |  |
| Force Index with One Shear Layer |  | 111 | 111 | 101 | 102 | 103 |
| Force Index with Two Shear Layers |  | 130 | 123 | 112 | 99 | 102 |

TABLE 2

Pinch Shock Test Results with Surrounding Mix having MA10 of 3.5 MPa

|  | W2 | S6 | S7 | S8 | S9 | S10 |
|---|---|---|---|---|---|---|
| Shear Layer MA10, MPa |  | 2.5 | 3.5 | 12 | 29 | 56 |
| Force Index with No Shear Layer | 100 |  |  |  |  |  |
| Force Index with One Shear Layer |  | 104 | 98 | 97 | 90 | 93 |
| Force Index with Two Shear Layers |  | 108 | 96 | 91 | 85 | 87 |

Since the softest materials in the sample composites is the carcass layer elastomer matrix (3.2 MPa), the results shown in Tables 1 and 2 demonstrate that shear layers that are softer or nearly as soft as the surrounding elastomer materials (S1, S2, S6) significantly increase the resistance to pinch shock. However, as the modulus increases significantly above the modulus of the softest material, as shown in the other samples, the resistance to pinch shock does not increase over the witness or it actually decreases. It should be noted that the increase shown in the resistance to pinch shock significantly increases with shear layers on both sides of the carcass layer.

Example 2

This example demonstrates that providing a shear layer between the carcass layer and the material surrounding the carcass layer having short fibers incorporated into the shear layer mix in accordance with the present invention improves resistance to tire damage caused by pinch shock.

The same testing method was conducted on the sample composites of this Example as were used in Example 1. The shear layers that were added to the composite samples were constituted of short-fiber reinforced elastomer compositions having an MA10 of 50 and 75 MPa respectively. The short fibers were aramid (available as T-320 fibers from Teijin Twaron Aramid having a length of 3 mm) and they were added in an amount of 5 phr and 10 phr respectively.

TABLE 3

Pinch Shock Test Results with Surrounding Mix having MA10 of 30 MPa

|  | W1 | FS1 | FS1 |
|---|---|---|---|
| Short Fiber Content, phr |  | 10 | 10 |
| Shear Layer MA10 X, MPa |  | 75 | 75 |
| Shear Layer MA10 Y, MPa |  | 6.9 | 6.9 |
| Orientation |  | X | Y |
| Force Index with Two Shear Layers | 100 | 125 | 125 |

TABLE 4

Pinch Shock Test Results with Surrounding Mix having MA10 of 3.5 MPa

|  | W2 | FS1 | FS1 | FS2 | FS2 |
|---|---|---|---|---|---|
| Short Fiber Content, phr |  | 10 | 10 | 5 | 5 |
| Shear Layer MA10 X, MPa |  | 75 | 75 | 50 | 75 |
| Shear Layer MA10 Y, MPa |  | 6.9 | 6.9 | 5.4 | 5.4 |
| Orientation |  | X | Y | X | Y |
| Force Index with Two Shear Layers | 100 | 103 | 107 | 108 | 95 |

As known to one having ordinary skill in the art, the short fibers are essentially aligned when the short-fiber reinforced material is milled or rolled out. Such alignment provides anisotropy so that the MA10 in the X-direction is higher than the MA10 in the Y-direction as shown in Tables 3 and 4. As shown in the results of the tables, the anisotropy properties of the shear layers had no effect on the test results.

Example 3

This example demonstrates that a shear layer constituted of an elastomeric fabric placed between the carcass layer and the material surrounding the carcass layer in accordance with the present invention improves resistance to tire damage caused by pinch shock.

Samples for testing were prepared by the same method used in Examples 1 and 2. However, instead of subjecting the samples to the quasi-static testing method described in the Examples above, the test method included testing on a dynamic impact machine. The machine consisted of a carriage supporting an indenter slideably mounted between two vertical parallel rails. The carriage was released at differed heights above the sample placed on a steel plate interdependent of a force sensor. The measurements collected included the speed of the indenter at impact with the sample, the displacement in the thickness of the sample and the force of impact. The resultant energy at impact was calculated.

TABLE 5

Pinch Shock Test Results, Spandex Shear Layer

|  | Energy (J) | | | |
|---|---|---|---|---|
|  | 48 J | 66 J | 75 J | 85 J |
| Witness, % Damaged Cords | 35 | 70 | 72 | 72 |
| Spandex Shear Layer, % Damaged Cords | 0 | 42 | 58 | 58 |

As seen in the test results shown in Table 5, the number of cords damaged during the test was significantly less in the sample having the spandex shear layers. The shear layers were spandex fabric having the tricot construction, the fabric being about 0.2 mm thick and being 82% nylon and 18% LYCRA. This fabric, typically used for swimwear, was obtained from Milliken & Company.

Example 4

This example demonstrates that a shear layer constituted of a polyurethane based elastomeric material placed between the carcass layer and the material surrounding the carcass layer in accordance with the present invention improves resistance to tire damage caused by pinch shock.

The same testing method was conducted on the P1 and P2 sample composites shown in Table 6 of this Example as were used in Example 1. The same testing method was conducted on the P3 sample components shown in Table 6 as were used in Example 3. The shear layers that were added to the composite samples were constituted of a polyurethaneurea adhesive, one having an MA10 of 50 MPa and the other having an MA10 of 190 MPa.

TABLE 6

Pinch Shock Test Results, Polyurethaneurea Shear Layer

|  | W1 | P1 | W2 | P2 | W3 | P3 |
|---|---|---|---|---|---|---|
| Surrounding Mix, MA10, MPa | 3.5 | 3.5 | 30 | 30 | 3.5 | 3.5 |
| Shear Layer MA10, MPa |  | 50 |  | 50 |  | 190 |
| Breakage Index with No Shear Layer | 100 |  | 100 |  | 100 |  |
| Breakage Index with One Shear Layer |  | 112 |  | 119 |  |  |
| Breakage Index with Two Shear Layers |  | 122 |  | 141 |  | 133 |

The thicknesses of the polyurethaneurea adhesives were quite thin—less than 0.5 mm. Even this thin shear layer provided significant improvement in reducing pinch shock damage as shown in Table 6.

There are many polyurethane based materials commercially available suitable for use according to embodiments of the present invention. In this example, the polyurethaneurea adhesive P3 having an MA10 of 190 MPa was a mix of an amine part (a mix of short aromatic diamine with long aromatic diamine) and an isocyanate part (an aliphatic tri-isocyanate which is the trimer of hexyl diisocyanate), the preparation of which is fully disclosed in U.S. Pat. No. 6,624,283, which is hereby fully incorporated by reference. The elongation at break of this material was around 15% at room temperature. The polyurethaneurea material P1, P2 having an MA10 of 50 MPa used in this example was more elastic than the P3 material, having an elongation at break of around 370% at room temperature. This material differed by replacing the tri-isocyanate with an aromatic di-isocyanate. Additional information concerning these materials is disclosed in international patent application The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A pneumatic tire, comprising:
    a tread supported by a crown, the crown being positioned radially-inward of the tread;
    a pair of sidewalls, each sidewall extending radially-inward from an axial edge of the crown, each sidewall defining a side of the tire;
    a pair of beads, each bead having a circumferentially-inextensible bead core defining a bead core center, each bead positioned radially-inward of each sidewall respectively;
    a carcass layer constructed from a plurality of radially-oriented carcass layer cords embedded in an elastomeric matrix and extending through the crown and between the beads, the carcass layer having a pair of carcass layer ends, each end being anchored in each bead respectively;
    one or more crown plies disposed radially-inward of the tread and radially-outward of the carcass layer and extending between the sidewalls of the tire;
    a pair of shoulder section shear layers, one of the pair located at each sidewall respectively and each positioned on at least one axial side of the carcass layer, the shoulder section shear layers extending from the sidewall towards the crown;
    a pair of bead section shear layers, one of the pair located at each sidewall respectively and each positioned on at least one axial side of the carcass layer, the bead section shear layers extending from the sidewall towards the bead core;
    wherein one or more of the pairs of shoulder section and bead section shear layers are constituted of an elastomeric fabric having elastomeric fibers woven in the fabric, the fabric woven in a tricot construction comprising between 18% and 25% spandex fibers, the remaining being nylon fibers, and
    wherein the shoulder section shear layers and the bead section shear layers in a pinch shocked region of the tire are opposite to one another across an interior of the tire.

2. The pneumatic tire of claim 1, wherein the shoulder section shear layers extend from the sidewall to a position radially-inward of the crown ply by a predetermined distance d from an axial edge of the crown ply.

3. The pneumatic tire of claim 2, wherein the distance d is at least 5 mm.

4. The pneumatic tire of claim 1, wherein the bead section shear layers extend to a position located at a predetermined distance h from the center of the bead core in a direction perpendicular to an axial direction of the tire.

5. The pneumatic tire of claim 4, wherein the height h is no more than 10 mm.

6. The pneumatic tire of claim 1, wherein each one of the pair of shoulder section shear layers has one shoulder shear layer positioned on an axially-inward side of the carcass layer.

7. The pneumatic tire of claim 1, wherein each one of the pair of shoulder section shear layers have two shoulder shear layers, one positioned on an axially-inward side of the carcass layer and the other positioned on an axially-outward side of the carcass layer.

8. The pneumatic tire of claim 1, wherein each one of the pair of bead section shear layers has one bead shear layer positioned on an axially-inward side of the carcass layer.

9. The pneumatic tire of claim 1, wherein each one of the pair of bead section shear layers have two bead shear layers, one positioned adjacent to an axially-inward side of the carcass layer and the other positioned adjacent to an axially-outward side of the carcass layer.

10. The pneumatic tire of claim 1, wherein a thickness of each shear layer adjacent to a side of the carcass layer is between 0.1 mm and 3 mm.

11. The pneumatic tire of claim 10, wherein the thickness is between 0.3 mm and 1 mm.

12. A pneumatic tire, comprising:
- a tread supported by a crown, the crown being positioned radially-inward of the tread;
- a pair of sidewalls, each sidewall extending radially-inward from an axial edge of the crown, each sidewall defining a side of the tire;
- a pair of beads, each bead having a circumferentially-inextensible bead core defining a bead core center, each bead positioned radially-inward of each sidewall respectively;
- a carcass layer constructed from a plurality of radially-oriented carcass layer cords embedded in an elastomeric matrix and extending through the crown and between the beads, the carcass layer having a pair of carcass layer ends, each end being anchored in each bead respectively;
- one or more crown plies disposed radially-inward of the tread and radially-outward of the carcass layer and extending between the sidewalls of the tire;
- a pair of shoulder section shear layers, one of the pair located at each sidewall respectively and each positioned on at least one axial side of the carcass layer, the shoulder section shear layers extending from the sidewall to a position radially-inward of the crown ply by a predetermined distance d from an axial edge of the crown ply;
- a pair of bead section shear layers, one of the pair located at each sidewall respectively and each positioned on at least one axial side of the carcass layer, the bead section shear layers extending from the sidewall to a position located at a predetermined distance h from the center of the bead core in a direction perpendicular to an axial direction of the tire,
- wherein one or more of the pairs of shoulder section and bead section shear layers are constituted of an elastomeric fabric having spandex fibers woven in the fabric, the fabric woven in a tricot construction comprising between 18% and 25% spandex fibers, the remaining being nylon fibers.

13. The pneumatic tire of claim 12, wherein the distance d is at least 10 mm.

14. The pneumatic tire of claim 12, wherein the shoulder section shear layers extend from the axial edge of the crown ply towards the bead section for a distance that is at least 20 mm.

15. The pneumatic tire of claim 12, wherein the height h is no more than 15 mm.

16. The pneumatic tire of claim 12, wherein the bead section shear layers extend towards the sidewall to a point that is at least 30 mm from the center of the bead core.

* * * * *